(12) United States Patent
Cordeiro et al.

(10) Patent No.: US 8,223,739 B2
(45) Date of Patent: Jul. 17, 2012

(54) METHOD AND APPARATUS OF DYNAMIC BANDWIDTH MANAGEMENT

(75) Inventors: Carlos Cordeiro, Portland, OR (US); Solomon B. Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 772 days.

(21) Appl. No.: 12/260,372

(22) Filed: Oct. 29, 2008

(65) Prior Publication Data

US 2010/0103885 A1    Apr. 29, 2010

(51) Int. Cl.
*H04J 3/16*    (2006.01)
(52) U.S. Cl. .................................... 370/346
(58) Field of Classification Search .................. None
See application file for complete search history.

(56) References Cited

U.S. PATENT DOCUMENTS

| | | | |
|---|---|---|---|
| 2002/0080816 A1* | 6/2002 | Spinar et al. | 370/449 |
| 2004/0002357 A1 | 1/2004 | Benveniste | |
| 2004/0037258 A1* | 2/2004 | Scherzer et al. | 370/338 |
| 2005/0213503 A1* | 9/2005 | Guo et al. | 370/230 |
| 2007/0253391 A1 | 11/2007 | Shao et al. | |
| 2007/0286140 A1 | 12/2007 | Kwon | |
| 2009/0046653 A1* | 2/2009 | Singh et al. | 370/330 |

OTHER PUBLICATIONS

International Search report from PCT/US2009/061817, mailed on Apr. 30, 2010.
Cordeiro, Carlos et al. "TCWG-2008-07-Section 8.4.3A-INTEL-0063-00", Next Generation mmWave Specification, Jul. 23, 2008.

* cited by examiner

*Primary Examiner* — Yong Zhou
(74) *Attorney, Agent, or Firm* — Shichrur & Co.

(57) ABSTRACT

A wireless communication device, a wireless communication system and a method of transmitting by a piconet controller (PNC) a poll request frame using beamforming techniques to one or more devices, wherein the poll request frame includes a time offset for sending a poll response frame by the device. The PNC receives the poll response frame with a channel bandwidth allocation request and dynamically allocating a channel bandwidth to the one or more devices according to the channel bandwidth allocation request.

22 Claims, 6 Drawing Sheets

METHOD AND APPARATUS OF DYNAMIC BANDWIDTH MANAGEMENT

BACKGROUND OF THE INVENTION

A personal wireless area network (WPAN) is a network used for communication among computing devices (for example, telephones and personal digital assistants) close to one person. The devices may or may not belong to the person in question. The reach of a WPAN may be a few meters. WPANs may be used for intrapersonal communication among the personal devices themselves, or for connecting via an uplink to a higher level network and the Internet. Personal area networks may be wired with computer buses such as a universal serial bus (USB) and FireWire.

The IEEE 802.15.3 Task Group 3c (TG3c) was formed in March 2005. TG3c is developing a millimeter-wave (mmWave) based alternative physical layer (PHY) for the existing 802.15.3 Wireless Personal Area Network (WPAN) Standard 802.15.3-2003. This mmWave WPAN may operate in a frequency band such as the 57-64 GHz unlicensed band defined by FCC 47 CFR 15.255. The millimeter-wave WPAN may allow high coexistence, in a close physical spacing, with all other microwave systems in the 802.15 family of WPANs. In addition, the millimeter-wave WPAN may allow a very high data rate of over 2 Gigabit per second (Gbps) for applications such as high speed internet access, streaming content download (e.g., video on demand, high-definition television (HDTV), home theater, etc.), real time streaming and wireless data bus for cable replacement. Optional data rates in excess of 3 Gbps may be provided.

In addition to the 802.15.3c Task Group, the IEEE 802.11 Working Group is also forming a Task Group to define a wireless local area network (WLAN) also operating in the millimeter-wave frequencies.

However, a mmWave communication link is significantly less robust than those at lower frequencies (e.g. 2.4 GHz and 5 GHz bands) due to both oxygen absorption and high attenuation through obstructions. In addition, the mmWave communication link may use directional antenna to increase the communication range, but the use of directional antenna makes a link very sensitive to mobility. For example, a slight change in the orientation of the device or the movement of a nearby object and/or person may disrupt the link.

In order to satisfy a link budget requirement, two forms of communication may be used. The first form is an Omni mode and the second form is a directional mode. In the Omni mode a low rate transmission (e.g., in the order of a few Megabit per second (Mbps)) and/or multiple directional transmissions (emulating an omni coverage) may be employed to compensate for the loss of antenna gain due to the (quasi) omni transmission. In the directional mode a high rate transmission (e.g., in the order of Gbps) may be used since the link employs directional antennas and hence may benefit from the higher antenna gain.

In the Directional mode various access schemes may be used. For example, a Carrier-Sense Multiple Access with Collision Avoidance (CSMA/CA) may be used at 60 GHz when high-data rate directional communication is desired and Time division Multiple Access (TDMA) access if desired. However, one of the deficiencies of TDMA is that it has very high scheduling latencies (e.g., at least one superframe worth of latency) which is unacceptable for applications requiring low latency such as Internet traffic and Wireless I/O. Furthermore, the TDMA access scheme in Directional mode may not allow a dynamical de-allocation and reallocation of a channel bandwidth. With regards to CSMA/CA, its performance at 60 GHz may not be desirable since it requires the use of low rate omni direction transmission. Thus there is a need for an access scheme that allows bandwidth to be de-allocated and reallocated dynamically based on traffic demands.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
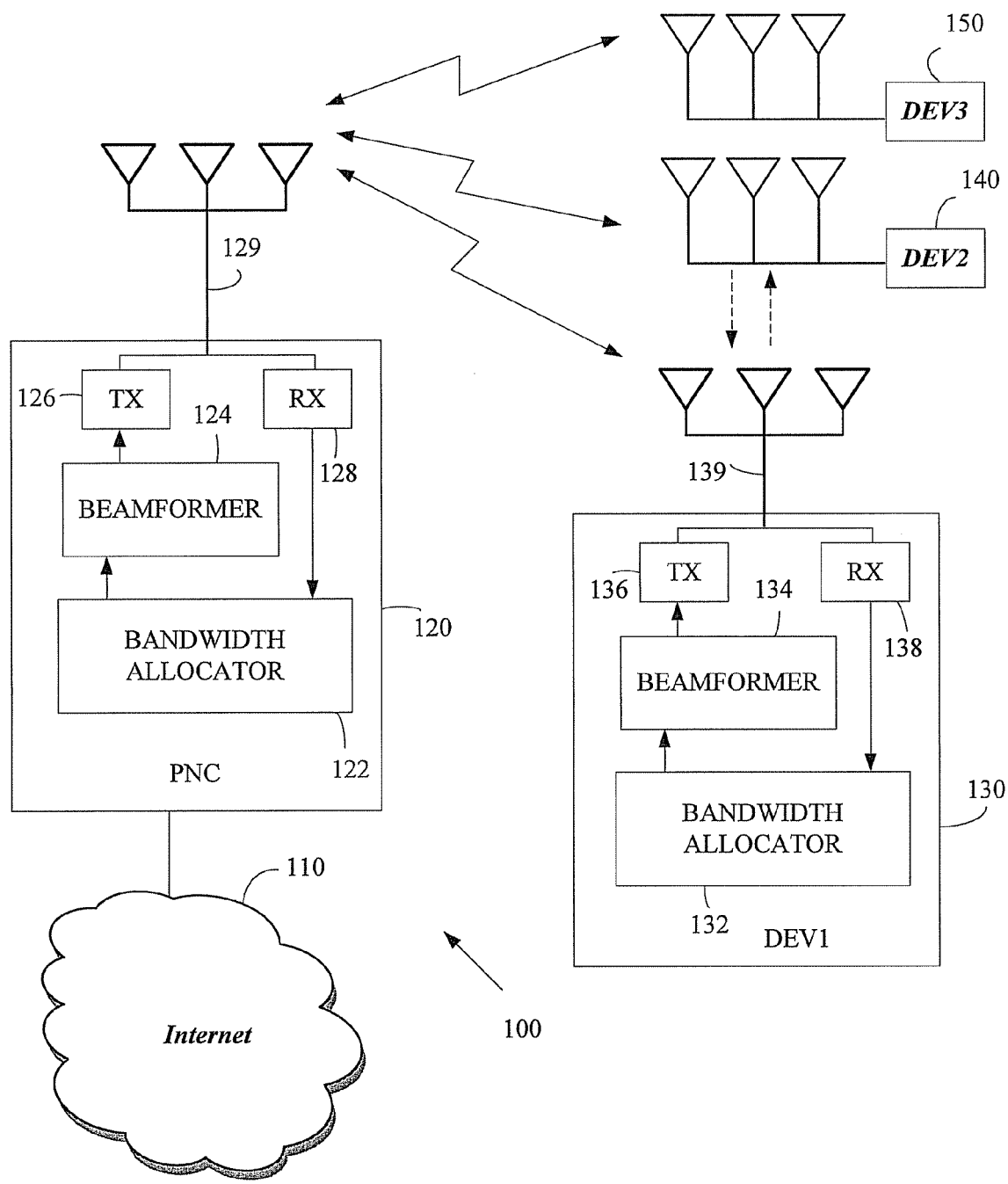
FIG. 1 is a schematic illustration of a wireless communication network according to exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, or transmission devices.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, wireless personal network (WPAN).

Types of WPAN stations intended to be within the scope of the present invention include, although are not limited to, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Turning first to FIG. 1, a schematic illustration of a wireless communication network 100, according to exemplary embodiments of the invention is shown. According to exemplary embodiments of the present invention, wireless communication network 100 may employ a WPAN. WPAN 100 may operate according to the standard developing by the IEEE 802.15.3 Task Group 3c (TG3c). TG3c has developed a millimeter-wave (mmWave) based alternative physical layer (PHY) for the existing 802.15.3 Wireless Personal Area Network (WPAN) Standard 802.15.3-2003.

According to some exemplary embodiment of the invention, WPAN 100 may include a network such as the Internet 110 operably coupled to a piconet coordinator (PNC) 120 and stations 130, 140 and 150. Stations 130, 140 and 150 are depicted as device 1 (DEV1), DEV2 and DEV3, respectively. Although the scope of the present invention is not limited in this respect, PNC 120 may be a notebook computer, a laptop computer or the like. Stations 130, 140 and 150 may include a camera, a mouse, an earphone, a speaker, a display, or a mobile personal device.

According to this exemplary embodiment of the invention, PNC 120 may include a bandwidth allocator 122, a beamformer 124, a transmitter 126, a receiver 128 and antennas 129. A device for example, DEV1 130 may include a bandwidth allocator 132, a beamformer 134, a transmitter 136, a receiver 138 and antennas 139.

Although the scope of the present invention is not limited in this respect, WPAN 100 may include a piconet which is one of possible topologies for the IEEE 802.15.3 WPAN. For example and according to one of the embodiments of the invention the piconet may include PNC 120 and several slave devices, for example DEVs 130, 140 and 150 within the transmission range of PNC 120. Any one of DEVs 130, 140 and 150 may include similar architecture as PNC 120 and may operate as a PNC, if desired.

Alternatively, in other embodiments of the present invention the wireless communication network may be a wireless local area network (WLAN). According to this example, the WLAN may include an access point (AP) and a plurality (e.g., two or more) stations within the transmission range of the AP. The AP in WLAN may be seen as the PNC 120 in the WPAN 100, while the stations in WLAN correspond to the DEVs 130, 140, and 150 in WPAN, although the scope of the present invention is not limited to this example.

According to at least one embodiment of the invention, the channel time in the piconet is based on the superframe, which may contain three major parts: the beacon, the Contention Access Period (CAP) and the Channel Time Allocation Period (CTAP). The PNC may provide a basic timing for the piconet by broadcasting beacon packets. Beacons may be used to set the timing allocation and management information for the piconet. Stations 130 and 140 may synchronize themselves with PNC 120 by receiving the beacons. The CAP may be used for asynchronous data or communication commands. For example, a medium access mechanism during the CAP may be Carrier Sense Multiple Access/Collision Avoidance (CSMA/CA). The CTAP includes the Channel Time Allocations (CTAs) and the management CTAs (MCTAs). The CTAs may be used for commands, isochronous streams, and asynchronous data and the medium access is based on TDMA. Collision-free transmissions are guaranteed in CTAs.

According to exemplary embodiment of the invention, PNC 120 may poll DEVs 130, 140 and 150. According to one example, PNC 120 may transmit a poll request frame using beamforming techniques to DEVs 130, 140 and 150. According to this example, beamformer 124 may generate an antenna beam directed to a polled DEV (e.g., DEV1 130) and transmitter 126 with antennas 129 may transmit the poll request frame to the device. For example, the poll request frame may include a time offset for sending a poll response frame. Stations 130 and/or 140 in their allocated time slot may transmit the response frame with a channel bandwidth allocation request. Receiver 128 of PNC 120 may receive a poll response frame from DEV1 130, a poll response frame from DEV2 140 and a poll response frame from DEV3 150. Bandwidth allocator 122 may dynamically allocate a required channel bandwidth to each DEV based on the channel bandwidth allocation request by transmitting a grant frame. After the allocation of the requested bandwidth DEV1 130 and/or DEV2 140 and/or DEV3 150 may communicate with each other (shown with dotted lines), although the scope of the present invention is not limited to this respect.

According to some embodiment of the invention, DEV1 130 may perform as a transmitter and may require more bandwidth and DEV2 140 may perform as a receiver and may need less or no allocation of bandwidth. PNC 120 may dynamically change the bandwidth allocation according to DEV1 130 and DEV2 140 requirements, although the scope of the present invention is not limited to this example.

According to exemplary embodiments of the invention PNC 120, DEV1 130, DEV2 140 and DEV3 150 may have similar architecture as illustrated in FIG. 1. It should be understood by those skilled in the art that in some embodiments of the invention beamformer 124 or 134, bandwidth allocator 122 or 132, may be implemented by hardware and/or by software and/or within a processor, if desired.

Figure 2:
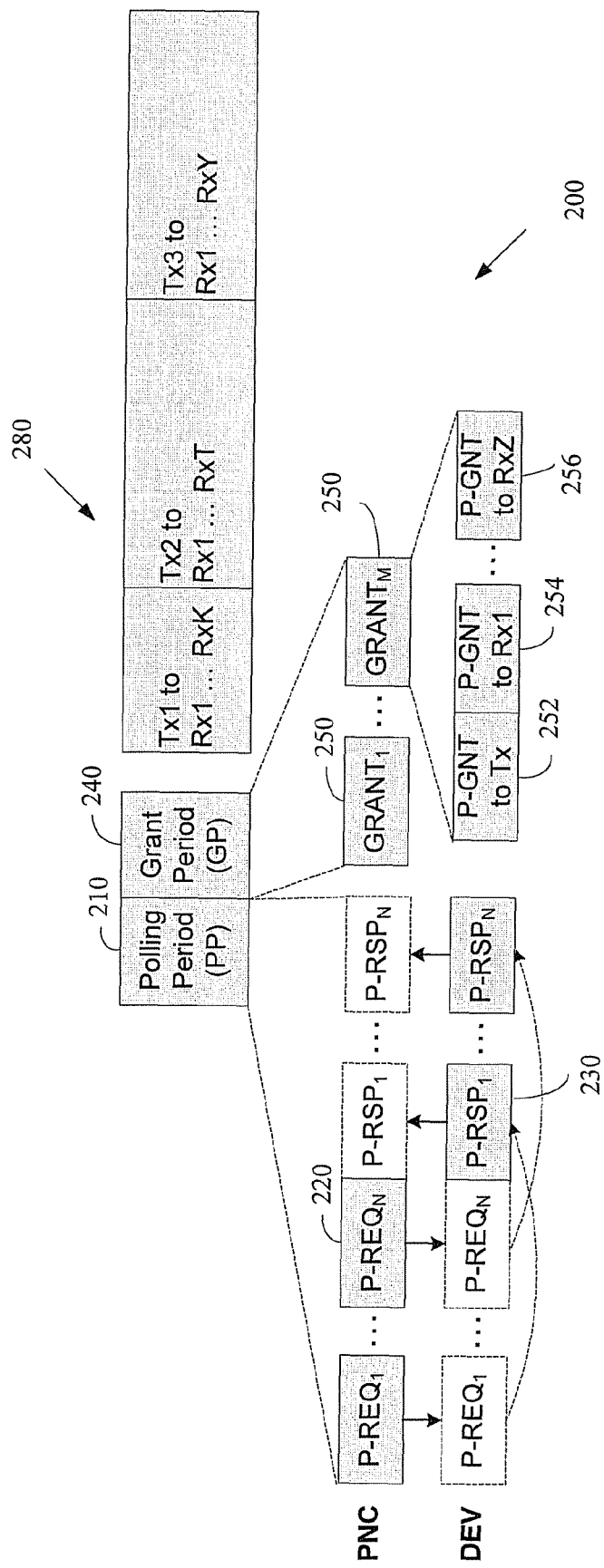
FIG. 2 is an illustration of a directional polling scheme of a wireless personal network according to some exemplary embodiment of the invention.

Turning to FIG. 2 an illustration of a directional polling scheme of a wireless personal network (WPAN) and/or wireless local area network (WLAN) according to some exemplary embodiment of the invention is shown. According to this example, WPAN and/or WLAN may include a central coordinator often termed as the PNC (piconet controller) and/or AP (Access Point). The PNC (e.g., PCN 120) may coordinate medium access by DEVs (e.g., DEV1 130, DEC2 140 and DEV3 150), using a directional polling scheme 200.

According to some exemplary embodiment of the invention polling scheme 200 may include a Polling Period (PP) 210, a Grant Period (GP) 240 and may or may not have dynamic bandwidth allocations (BWA) used for data transmission. The transmissions may take place in the directional mode using beamforming techniques. For example, A DEV (e.g., DEV1 130) that participates in the polling exchange may stay in active mode with antennas beamformed towards the PNC (e.g., PCN 120), if desired.

During the PP 210 time period, the PNC may poll a subset of its associated DEVs (e.g., DEVs 130, 140 and 150). This is done through the transmission of a Poll Request (P-REQ) frame 220 from the PNC to the intended DEV. In another embodiment of the invention, the wireless communication network may be the WLAN. In this embodiment, the P-REQ frame may be a modified QoS-Poll frame used in the IEEE 802.11 standard, if desired. Upon receiving a P-REQ frame (shown as a dotted box), a polled DEV may respond to the PNC with a Poll Response (P-RSP) frame 230 in its scheduled response slot. P-REQ frame 220 from the PNC to DEV may include a time offset that the polled DEV may use to send back its P-RSP frame 230. Having the feedback P-RSP frames (shown as dotted boxes) from the DEVs being scheduled may increase the efficiency of the polling scheme since it minimizes the need for turnaround times in between frames.

According to some embodiments of the invention, both P-REQ 220 and P-RSP 230 frames may carry bandwidth allocation requests for the PNC to communicate to the DEVs, for the DEVs to communicate to the PNC, and for the DEVs to communicate among themselves. Based on these bandwidth allocation requests, the PNC may dynamically allocate bandwidth to the DEVs in a real-time mode. Thus, the allocation may be made immediately instead of waiting until the occurrence of the next superframe. Alternatively and/or additionally, P-REQ and P-RSP frames may also carry the address of the DEVs to which bandwidth is to be dynamically allocated for the purpose of data communication.

After obtaining the bandwidth allocation requests from the DEV(s), the PNC may initiate GP 240 following the end of the PP 210. During the GP 240, the PNC may grant a dynamic BWA based on the set of bandwidth allocation requests it received in the preceding PP 210. The PNC may perform bandwidth grants 250 through the transmission of Polling Grant (P-GNT) frames 252, 254 and 256 to the transmitter and receiver(s) of DEV participating in the granted link. DEVs that may be granted a dynamic BWA by the PNC may then initiate communication 280 (between various transmitters and receivers) at the scheduled time indicated in the P-GNT frames 252, 254 and 256, if desired. Alternatively, in some embodiments of the invention, the PNC may initiate a GP 240 without even performing a PP preceding a GP, although the scope of the present invention is not limited to this example.

Figure 3:
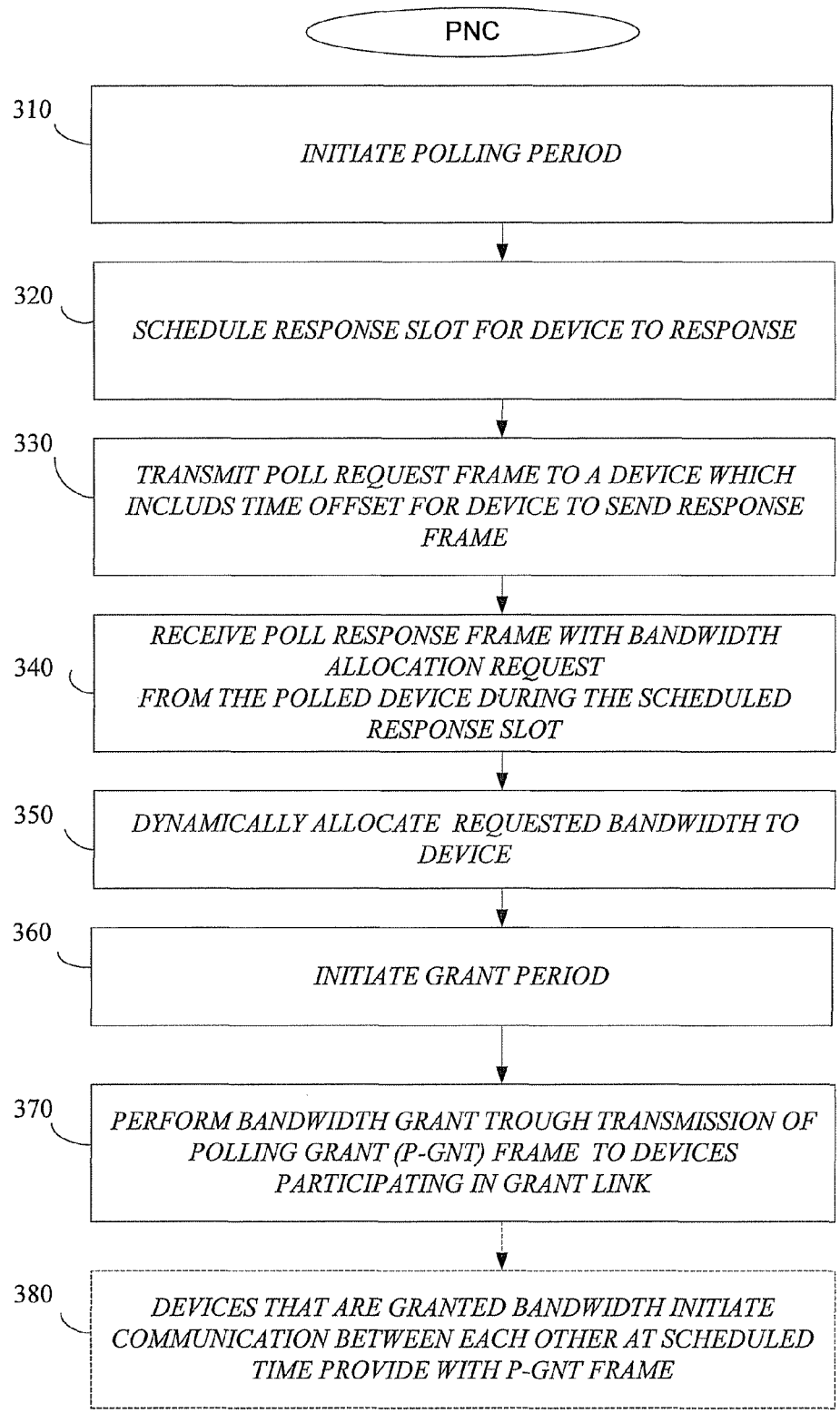
FIG. 3 is a flow chart of a method of bandwidth allocation by using a polling scheme, according to some embodiments of the invention.

Turning to FIG. 3 is a flow chart of a method of bandwidth allocation by using a polling scheme, according to some embodiments of the invention is shown. According to this exemplary embodiment of the invention, a PNC (e.g., PNC 120) may initiate a polling period with each one of the devices (e.g., DEVs 130, 140 and 150) participating in the WPAN (step 310). The PNC may schedule for each device a response slot to respond (step 320). The PNC may transmit a poll request to each device. For example, the poll request frame may include a time offset for the device to send a response frame, if desired (step 330).

Each DEV may transmit the response frame at an allocated time slot for each DEV to response according to the time offset received with the poll request frame. According to some embodiments of the invention, the poll request frame may include a bandwidth allocation request and DEV addresses. The PNC may receive the poll response frame with the bandwidth allocation request from the polled devices (step 340) and may dynamically allocated the requested bandwidth to the devices e.g., DEV1 130, DEV2 140, DEV3 150 (step 350).

Although the scope of the present invention is not limited to this exemplary embodiment of the invention, the PNC (e.g., PNC 120) may initiate a grant period (step 360). During the grant period (e.g., grant period 240), the PNC (e.g., PNC 120) may perform a bandwidth grant through transmissions of polling grant (P-GNT) frames to the devices participating in the grant link (step 370). The devices that granted the requested bandwidth may initiate communication between the devices at the scheduled time that provided with the P-GNT frame (step 380), although the scope of the present invention is not limited to this respect.

Figure 4:
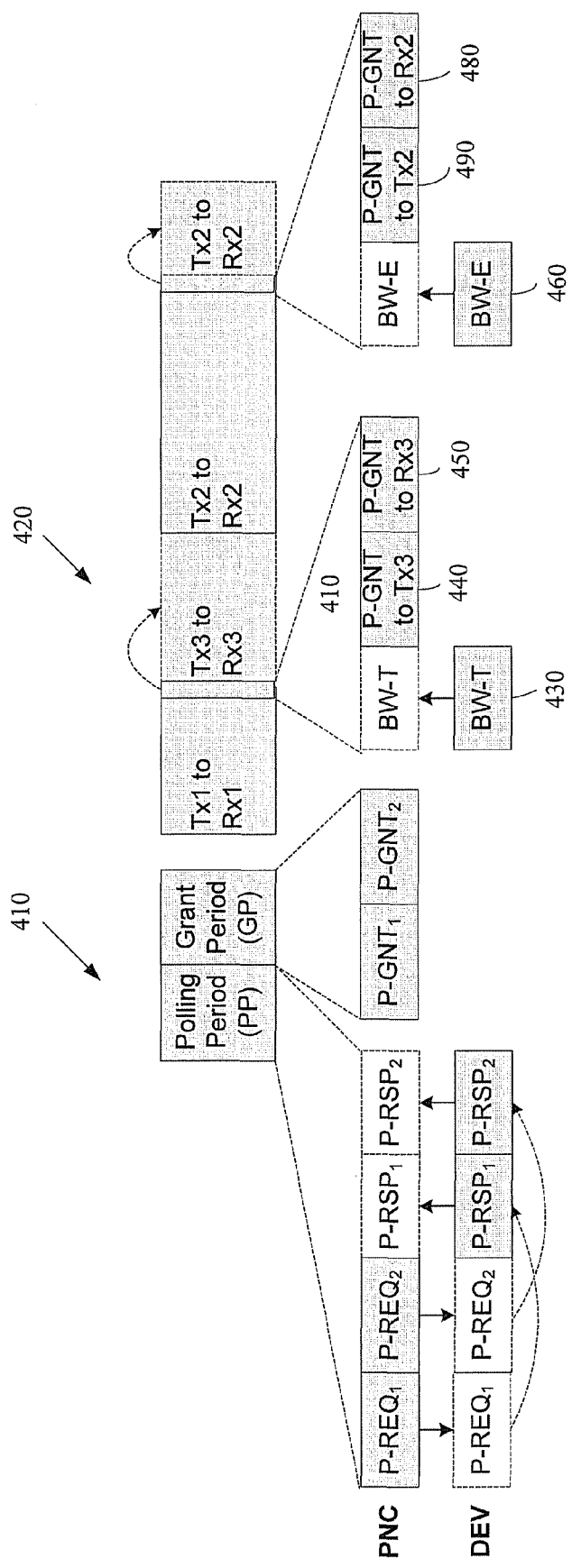
FIG. 4 is an illustration of a directional polling scheme and a bandwidth truncation and a bandwidth extension schemes of a wireless personal network according to some exemplary embodiment of the invention.

Turning to FIG. 4 a schematic illustration of a directional polling scheme and a bandwidth truncation and bandwidth extension schemes of a wireless personal network according to some exemplary embodiment of the invention is shown. The illustration includes two parts: the first part 410 illustrates a polling scheme according to some embodiments of the invention which is similar to the polling scheme which described by FIG. 2 and the method of FIG. 3. The second part 420 illustrates a polling-based bandwidth truncation and extension schemes.

According to one exemplary embodiment of the invention, the PNC may grant multiple reservations during the GP. Battery constrained DEVs may go into power save mode and wake up only when needed for their communication. Other DEVs may stay in the active mode to take advantage of dynamic bandwidth allocation (BWA) truncations and extension over the polling-based channel access scheme, if desire.

The BWA truncation may take place when a device which defined as a transmitter of a link decides to relinquish (i.e., truncate) the remainder of the current BWA it has (e.g., illustrated as Tx1). In this example, Tx1 may transmit a directional bandwidth truncation (BW-T) message 430 to the PNC requesting that the BWA be truncated. In response, the PNC may accept the request and may select to operate according to one of the following options. The first option may be to "do nothing" in which the PNC may allow the remaining time in the allocation to be unused. The second option may be to transmit P-REQ frames to other DEVs, with the goal of allocating the freed up channel time to another link. The third option may be to transmit the P-GNT messages 440 and 450 to DEVs (e.g., Tx3 and Rx3), respectfully, to allocate the freed up bandwidth for communication between these devices, although the scope of the present invention is not limited to this example.

According to some exemplary embodiments of the invention, a BWA extension is the opposite of BWA truncation. In BWA extension, a device defined as a transmitter of the link may desire to extend its current BWA due to traffic needs over the link (e.g., illustrated as Tx2). In the example shown in FIG. 4, Tx2 may transmit a directional BW-E (Bandwidth Extension) message 460 to the PNC requesting for that BWA to be extended for a pre-determined amount of time. In response, the PNC may operate as follows: 1) Reject the request. In this case, the BWA to the link bandwidth remains the same. 2) Grant the extension, in this case the DEVs participating in the link may be allowed to continue communication for the additional time granted by the PNC. The PNC may transmit P-GNT messages 480, 490 to DEVs Tx2 and Rx2, informing these DEVs of the additional time granted for communication, although the scope of the present invention is not limited in this respect.

Figure 5:
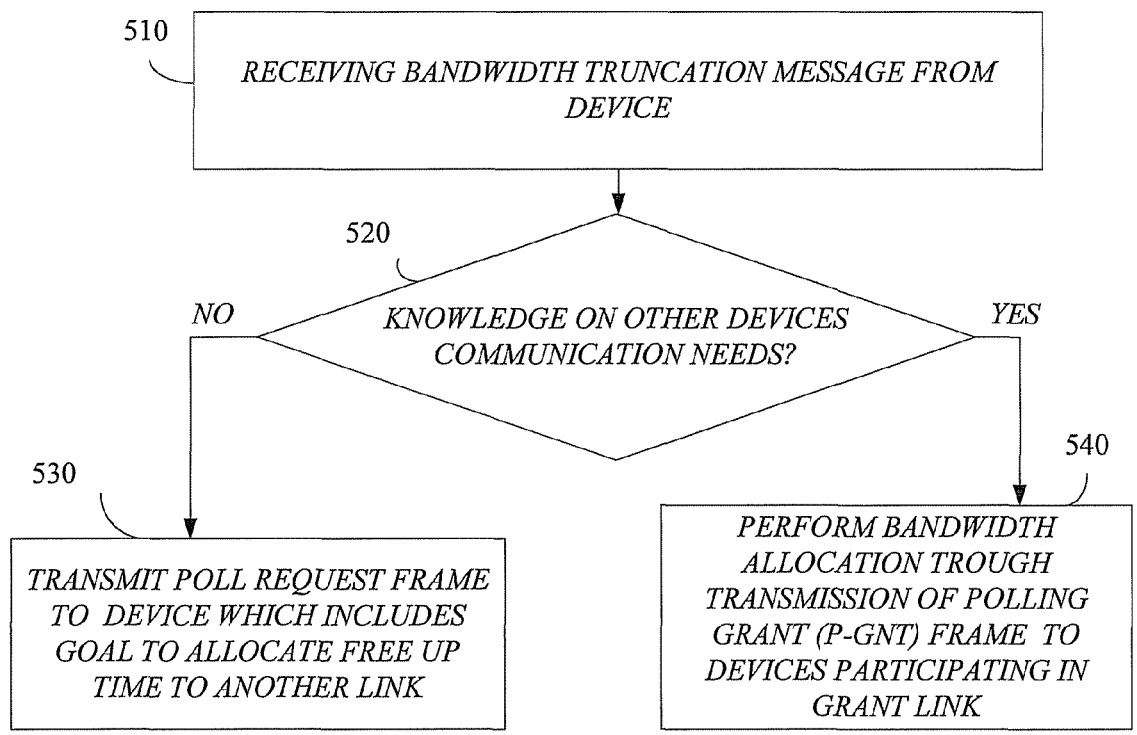
FIG. 5 is a flow chart of a method of a bandwidth extension, according to some embodiments of the invention.

Turning to FIG. 5, a flow chart of a method of a bandwidth truncation, according to some embodiments of the invention is shown. According to this example method, a PNC may receive a bandwidth truncation message from a device (step 510). If the PNC has knowledge of the communication needs of the devices e.g., allocated bandwidth, desired bandwidth (step 520), the PNC may perform bandwidth truncation through transmissions of polling grant (P-GNT) to each one of the devices participating in the grant link (text box 540). The PNC may have knowledge from the preceding PP with the DEVs. If the PNC does not have knowledge of the device's communication needs e.g., allocated bandwidth, desired bandwidth (step 520), the PNC may transmit a poll request frame to the device (step 530). For example, the poll request frame may include a goal to allocate a free up time to another link, if desired (step 530).

Figure 6:
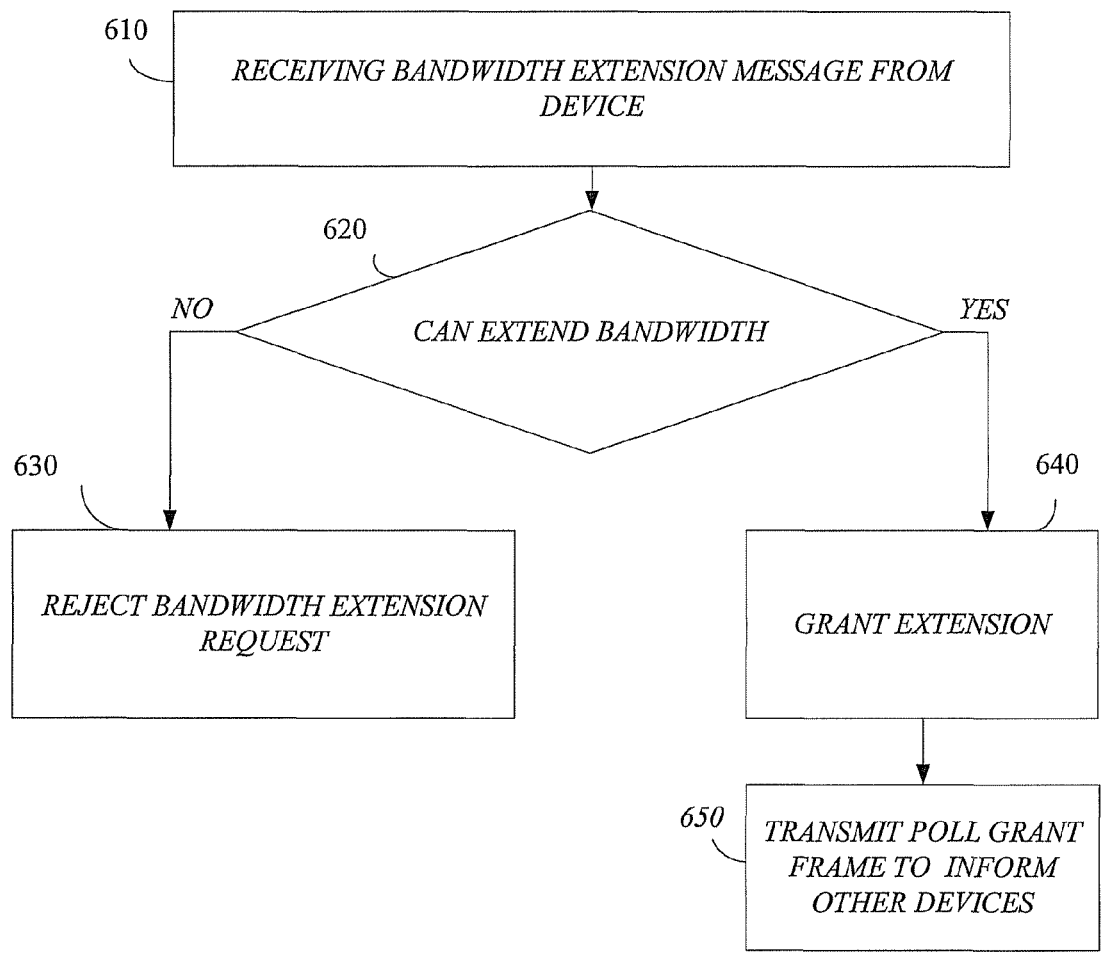
FIG. 6 is a flow chart of a method of a bandwidth extension, according to some embodiments of the invention.
Figure 3:
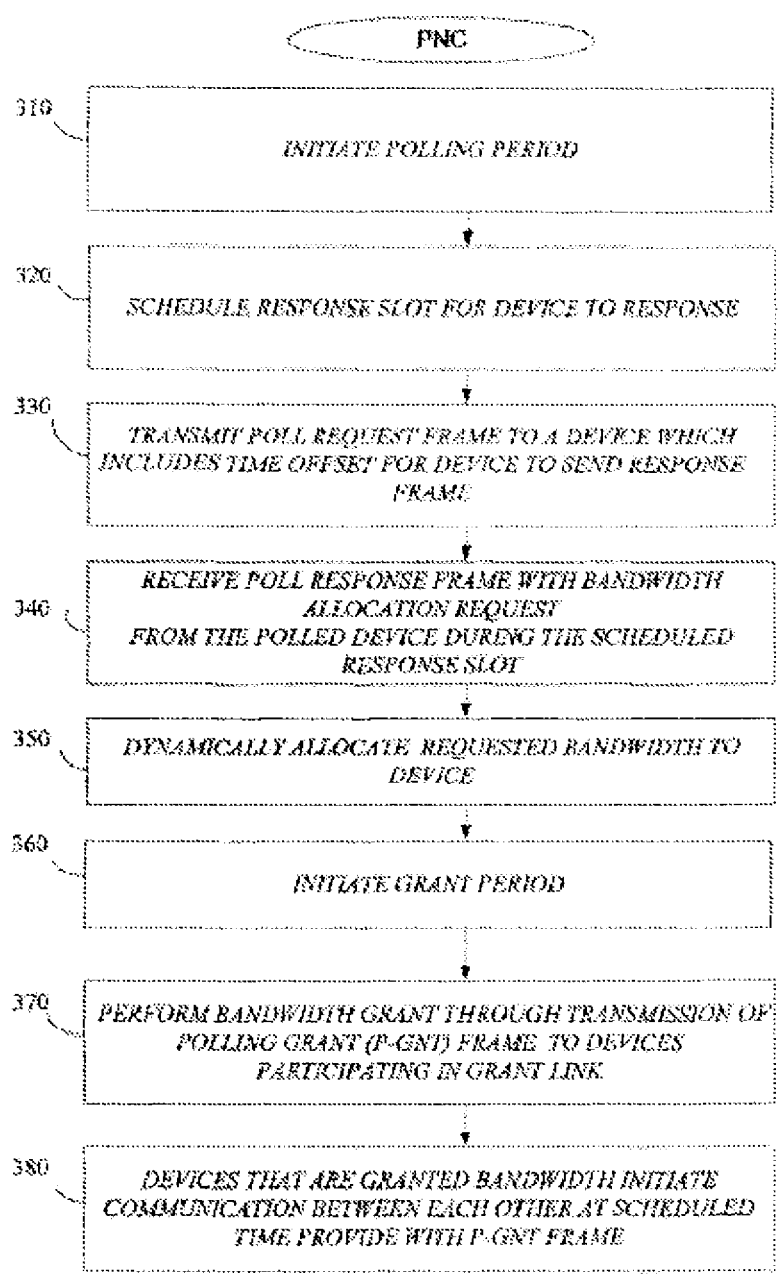
Figure 5:
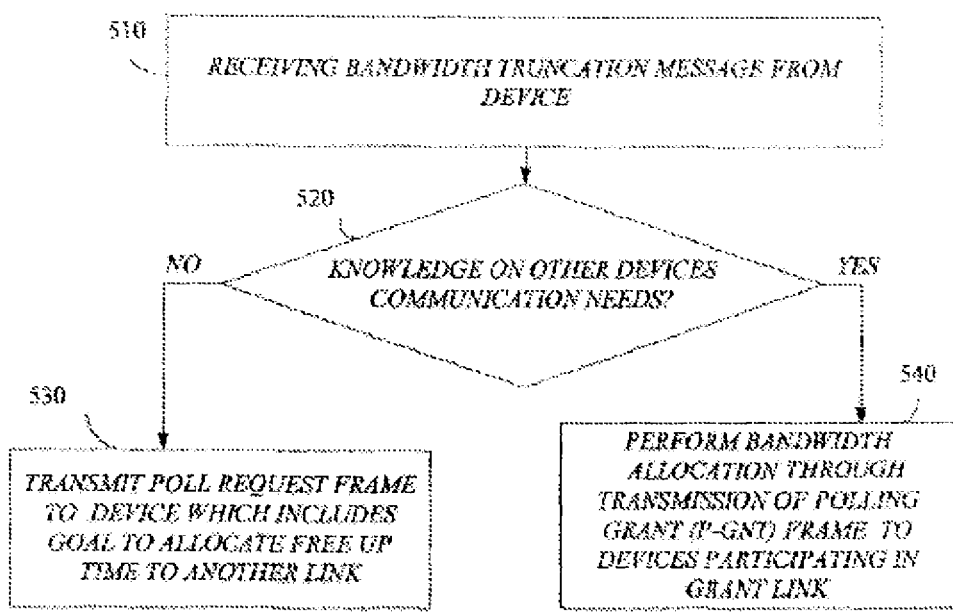

Turning to FIG. 6 a flow chart of a method of a bandwidth extension, according to some embodiments of the invention is shown. According to this exemplary method, a PNC may receive a bandwidth extension method from a device (step 610). The PNC may check if the bandwidth may be extended (step 620). If the bandwidth may be extended the PNC may transmit a P-GNT frame to the device to grant the requested extension (step 640) and may transmit a poll grant frame to inform the other device of the link that a bandwidth extension has been granted (step 650). However, if the bandwidth may not be extended then the PNC may reject the bandwidth extension request (step 630), although the scope of the present invention is not limited to in this respect.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method of communication in a wireless communication network comprising:
   during a polling period, transmitting a plurality of poll request frames individually directed to a plurality of devices using beamforming techniques, wherein the plurality of poll request frames include a plurality of different time offsets for sending a plurality of poll response frames;
   during the polling period, directly receiving a poll response frame from a first device of said devices, the poll response frame including a channel bandwidth allocation request to communicate with a second device of said devices;
   during a grant period, subsequent to said polling period, dynamically allocating a channel bandwidth according to the channel bandwidth allocation request, said allocating including directly transmitting to said first and second devices grant frames granting a scheduled period for direct communication between said first and second devices; and
   truncating said scheduled period by:
      receiving a bandwidth truncating message from said first device;
      obtaining knowledge on a channel bandwidth usage; and
      transmitting a polling grant frame with a required bandwidth according to the channel bandwidth usage.

2. The method of claim 1, wherein receiving said poll response frame from said first device comprises receiving said poll response frame from a transmitter device of said first device, and wherein transmitting said grant frames to said first and second devices comprises transmitting said grant frames to said transmitter device and to a receiver device of said second device.

3. The method of claim 1 comprising:
   scheduling a plurality of response time slots for said plurality of devices.

4. The method of claim 1, wherein obtaining comprises:
   transmitting a request frame which includes a goal of allocating a link free up time to another link.

5. The method of claim 1 comprising:
   receiving a channel bandwidth extension message from said first device requesting to extend said scheduled period; and
   granting a channel bandwidth extension to extend said scheduled period based on a link bandwidth usage.

6. The method of claim 5, wherein granting comprises:
   transmitting a poll grant frame to advertise the channel bandwidth extension.

7. A wireless communication device comprising:
   a transmitter to transmit, during a polling period, a plurality of poll request frames individually directed to a plurality of devices using beamforming techniques, wherein the plurality of poll request frames include a plurality of different time offsets for sending a plurality of poll response frames;
   a receiver to directly receive, during the polling period, a poll response frame from a first device of said devices, the poll response frame including a channel bandwidth allocation request to communicate with a second device of said devices; and
   a bandwidth allocator to dynamically allocate a channel bandwidth for direct communication between said first and second devices according to the channel bandwidth allocation request,
   wherein said transmitter is to transmit to said first and second devices, during a grant period, subsequent to said polling period, grant frames granting a scheduled period for the direct communication between said first and second devices;
   wherein the bandwidth allocator is able to truncate the scheduled period by:
      receiving a bandwidth truncating message from said first device;
      obtaining knowledge on a channel bandwidth usage; and
      transmitting a polling grant frame with a required bandwidth according to the channel bandwidth usage.

8. The wireless communication device of claim 7, wherein said first device comprises a transmitter device and said second device comprises a receiver device.

9. The wireless communication device of claim 7, wherein the bandwidth allocator is to schedule a plurality of response time slots for said plurality of devices.

10. The wireless communication device of claim 7, wherein obtaining comprises:
    transmitting a request frame which includes a goal of allocating a link free up time to another link.

11. The wireless communication device of claim 7, wherein
    the receiver is to receive a channel bandwidth extension message from said first device requesting to extend said scheduled period,
    and wherein the bandwidth allocator is to grant a channel bandwidth extension to extend said scheduled period based on a link bandwidth usage.

12. The wireless communication device of claim 11, wherein the transmitter is to transmit a poll grant frame to advertise the channel bandwidth extension.

13. The wireless communication device of claim 7 comprising a piconet coordinator (PNC).

14. The wireless communication device of claim 7 comprising an access point (AP).

15. A wireless communication network comprising a station including:
- a transmitter operably coupled to a beamformer and to two or more antennas to transmit, during a polling period, a plurality of directional beams, which include a plurality of poll request frames individually directed to a plurality of devices, wherein the plurality of poll request frames include a plurality of different time offsets for sending a plurality of poll response frames;
- a receiver to directly receive, during the polling period, a poll response frame from a first device of said devices, the poll frame including a channel bandwidth allocation request to communicate with a second device of said devices; and
- a bandwidth allocator to dynamically allocate a channel bandwidth for direct communication between said first and second devices according to the channel bandwidth allocation request,
- wherein said transmitter is to transmit to said first and second devices, during a grant period, subsequent to said polling period, grant frames granting a scheduled period for the direct communication between said first and second devices;
- wherein the bandwidth allocator is able to truncate the scheduled period by:
  - receiving a bandwidth truncating message from said first device;
  - obtaining knowledge on a channel bandwidth usage; and
  - transmitting a polling grant frame with a required bandwidth according to the channel bandwidth usage.

16. The wireless communication network of claim 15, wherein said first device comprises a transmitter device and said second device comprises a receiver device.

17. The wireless communication network of claim 16, wherein the bandwidth allocator is to schedule a plurality of response time slots for said plurality of devices.

18. The wireless communication network of claim 15, wherein obtaining comprises:
- transmitting a request frame which includes a goal of allocating a link free up time to another link.

19. The wireless communication network of claim 15 wherein
- the receiver is to receive a channel bandwidth extension message from said first device requesting to extend said scheduled period;
- and wherein the bandwidth allocator is to grant a channel bandwidth extension to extend said scheduled period based on a link bandwidth usage.

20. The wireless communication network of claim 19, wherein the transmitter is to transmit a poll grant frame to advertise the channel bandwidth extension.

21. The wireless communication network of claim 15 comprising a wireless personal area network, wherein the station comprises a piconet coordinator (PNC).

22. The wireless communication network of claim 15 comprising a wireless local area network, wherein the station comprises an access point (AP).

* * * * *

UNITED STATES PATENT AND TRADEMARK OFFICE
CERTIFICATE OF CORRECTION

PATENT NO.         : 8,223,739 B2
APPLICATION NO.    : 12/260372
DATED              : July 17, 2012
INVENTOR(S)        : Carlos Cordeiro et al.

It is certified that error appears in the above-identified patent and that said Letters Patent is hereby corrected as shown below:

In the drawings, Fig. 3 & 5 should be replaced with the corrected Fig. 3 & 5 as shown on the attached pages.

On drawing sheet 3 of 6, in Figure 3, in Box No. 330, line 2, delete "INCLUDS" and insert -- INCLUDES --, therefor.

On drawing sheet 3 of 6, in Figure 3, in Box No. 370, line 1, delete "TROUGH" and insert -- THROUGH --, therefor.

On drawing sheet 5 of 6, in Figure 5, in Box No. 540, line 2, delete "TROUGH" and insert -- THROUGH --, therefor.

Signed and Sealed this
Twenty-first Day of May, 2013

Teresa Stanek Rea
*Acting Director of the United States Patent and Trademark Office*